Aug. 17, 1937.   R. C. RUSSELL   2,090,335
SERVO MECHANISM
Filed March 26, 1934   3 Sheets-Sheet 1

INVENTOR.
Robert C. Russell.
BY
Harness, Dickey, Pierce & Mann.
ATTORNEY.

Aug. 17, 1937.   R. C. RUSSELL   2,090,335
SERVO MECHANISM
Filed March 26, 1934   3 Sheets-Sheet 3

INVENTOR.
Robert C. Russell.
BY
Harness, Dickey, Pierce & Hann
ATTORNEYS.

Patented Aug. 17, 1937

2,090,335

UNITED STATES PATENT OFFICE 2,090,335

SERVO MECHANISM

Robert C. Russell, Detroit, Mich.

Application March 26, 1934, Serial No. 717,393

27 Claims. (Cl. 188—140)

This invention relates to that class of power amplifying mechanism commonly termed "servo" mechanism and is of a type particularly applicable for operating the brakes of motor vehicles, the principal object being the provision of a device of this type that is simple in construction and efficient in operation and such as to permit the operator to have complete control at all times over the amount of force being applied by the mechanism.

Objects of the invention include the provision of a servo mechanism applicable for use in connection with a motor vehicle for applying the brakes thereof and obtaining its source of energy from the rolling momentum of the vehicle; the provision of a servo mechanism for applying the brakes of a motor vehicle through the rolling momentum thereof and so associated with the propeller shaft of the vehicle as to receive its source of power therefrom; the provision of a mechanism of the type described so constructed and arranged that the high output forces from the servo mechanism are not carried through anti-friction bearings rotating at propeller shaft speed; the provision of a mechanism of the type described so constructed and arranged that substantially all of the relatively rotatable members are separated by anti-friction means with the exception of the elements of the friction device thereof.

Other objects include the provision of a servo mechanism applicable for use in applying the brakes of a motor vehicle in which one of the friction elements thereof is so constructed and arranged with respect to its driving shaft that upon operation of the servo mechanism a portion of the force provided thereby produces a counter force tending to resist further application of the servo mechanism by the operator, and in which the opposing force is proportional to the amount of force exerted by the servo mechanism, thereby enabling the operator to feel the amount of force being exerted by the servo mechanism; the provision of a servo mechanism that is operable regardless of the direction of rotation of its driving shaft; and the provision of a servo mechanism operable with a minimum amount of angular movement of its driving shaft.

Other objects are to provide a servo mechanism particularly applicable for the operation of the brakes of motor vehicles and so constructed and arranged that the operator may, to a high degree, sense the degree of applied braking force either while increasing or decreasing such braking force, to the end that satisfactory two way modulation of the braking effect on the vehicle is obtainable.

Another object is to provide a servo mechanism capable of being actuated with a minimum amount of movement of the manually controlled members therefor, the operator resorting mainly to the accurate degree of antagonistic force or reaction feel as the agent by which he gauges the force output of the servo mechanism, the minimum movement required for complete actuation of the mechanism reducing the physical effort required for its operation.

A further object is to provide a servo mechanism of the type described that is low in weight, small and compact in design and composed of parts which lend themselves readily to low cost production and are not subjected to undue stresses in operation.

The above being among the objects of the present invention, the same consists in certain novel features of construction and combinations of parts to be hereinafter described with reference to the accompanying drawings and then claimed, having the above and other objects in view.

In the accompanying drawings which illustrate suitable embodiments of the present invention and in which like numerals refer to like parts throughout the several different views.

It is well recognized in the motor vehicle art that the modern tendency is toward greater ease of operation of the various controlling elements thereof so that the operator will need to expend only a minimum amount of physical effort in easily and surely controlling the operation of the vehicle. Toward this end various constructions have been provided or suggested for power operation of the vehicle brakes for it is the brakes that usually require the greatest amount of physical exertion on the part of the vehicle operator during operation of the vehicle. In the past there have been several such classes of brake mechanisms developed, some of which employ artificially created air pressure, some of which employ the suction existing in the intake manifold of the engine provided for driving the vehicle as the source of power, some of which have employed the pressure of the lubricant in the engine lubricating system as a source of power, and still others which have employed the momentum of the vehicle as a source of power. It is to this last class of devices, which are commonly known as "servo" mechanisms, that the present invention is directed, although it will be understood that in its broader aspects the present invention may be applicable to devices other than motor vehicles or for purposes other than operating the brakes of motor vehicles. Accordingly, while the specific application of the present invention for the purpose of illustration will be confined solely to its application to motor vehicles for the purpose of applying the brakes thereof, its application to other uses will be readily apparent to those skilled in the art.

There have been various disadvantages in constructions heretofore proposed for mechanical servo mechanisms of the type described. One of the chief difficulties has been that in prior constructions it has been impossible or substantially impossible for the operator of a vehicle, in operating the servo mechanism to apply the brakes, to feel the amount of force exerted by the servo mechanism during such application and consequently he has no "yard stick" by which he may properly judge the degree of braking effort being applied to the vehicle. Another disadvantage has been in prior constructions of the mechanical servo type that it has been substantially impossible to accurately control the degree of braking effort effected by the servo mechanism and particularly to gradually reduce the braking effort from a position of maximum effort in amounts and in degrees proportional to the relief of pressure on the control element by the operator of the vehicle. A further disadvantage has been that in the operation of such prior servo mechanical mechanisms it has been necessary for the operator of the vehicle to move his foot through substantially the same range of movement as is customary in purely manually operated brakes whereas, to obtain a maximum degree of ease and comfort in the operation of the brakes, the operator should be required to move his foot only a minimum distance. These and other disadvantages of mechanical servo constructions heretofore suggested are overcome by the structure provided in accordance with the present invention.

Figures 1, 2:
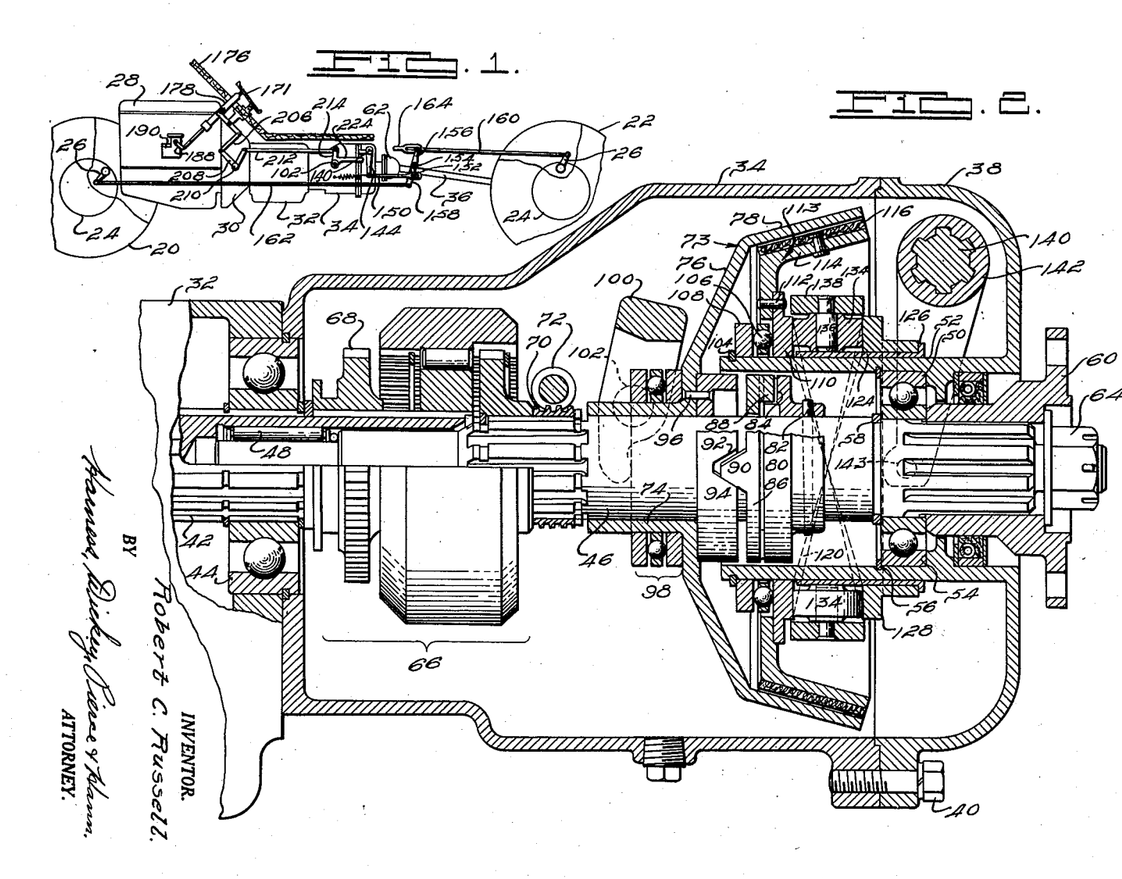
Figure 1 is a more or less diagrammatic, partially broken, side elevational view of a motor vehicle illustrating the application of a servo mechanism thereto for the purpose of actuating its brakes.
Fig. 2 is an enlarged vertical sectional view taken centrally through the servo mechanism shown applied to the motor vehicle in Fig. 1, the mechanism being shown in inoperative position.

Referring now to the drawings, in Fig. 1 there is indicated in a more or less diagrammatic manner a motor vehicle having a pair of front wheels 20 and a pair of rear wheels 22, each of which is provided with a brake mechanism indicated generally at 24 and each of which brake mechanisms is provided with an operating arm or lever 26. The vehicle is also shown as including an engine 28 at the rear end of which is located a suitable type of clutch mechanism contained within the clutch housing 30 secured to the rear face of the engine 28 in a conventional manner. A transmission casing 32, which may contain any suitable or conventional transmission or change speed gearing, is secured to the rear end of the clutch housing 30 in a conventional manner, and a casing 34 which serves as a housing for mechanism included in the present invention is shown as being suitably secured to the rear end of the transmission housing 32. A propeller shaft 36 completes the power transmission line between the engine 28 and the usual rear axle (not shown) connecting the rear wheels 22 in the usual manner.

Figure 3:
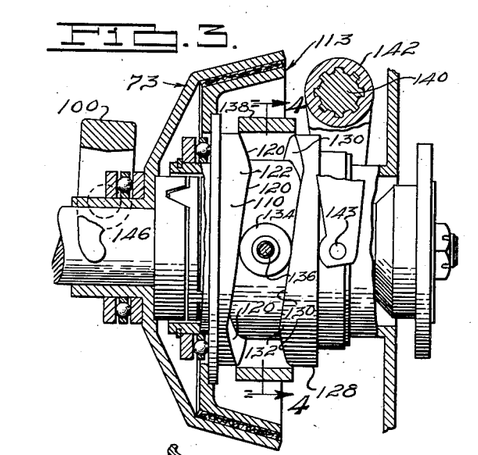
Fig. 3 is a slightly reduced view of a portion of the mechanism shown in Fig. 2 but with certain of the parts not shown in section so as to better illustrate the same, and also indicating the servo mechanism in an operative position.
Figure 4:
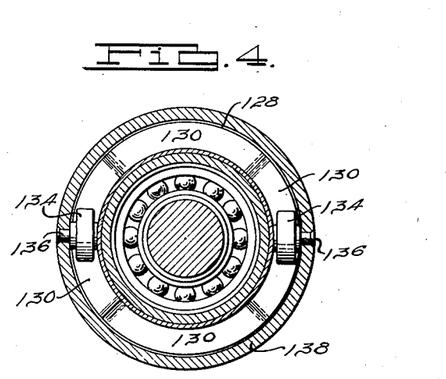
Fig. 4 is a transverse sectional view taken on the line 4—4 of Fig. 3.

Referring now to Figs. 2 to 4, inclusive, and particularly to Fig. 2, it will be noted that the servo casing 34 includes a removable rear portion or cover 38 which may be secured to the main portion thereof by screws 40 or other suitable means. Also referring to Fig. 2 it will be noted that the rear end of the main transmission shaft 42 is provided with a suitable bearing assembly 44 in the rear wall of the transmission housing 32 and projects rearwardly therethrough. The rear end portion of the main transmission shaft 42 is of hollow construction and the reduced forward end of the servo shaft 46 is received therein and provided with suitable bearings 48 permitting relative rotation between it and the main transmission shaft 42. The rear end of the servo shaft 46 is suitably supported in a bearing assembly 50 which in turn is supported internally of a forwardly projecting sleeve 52 formed integrally with the cover 38 concentrically with the shaft 46.

The bearing assembly 50 is maintained against axial displacement relative to the sleeve 52 by its outer race abutting a radial shoulder 54 formed internally thereof at one end and a contractible split spring stop ring 56 sprung into a cooperating annular groove formed internally of the sleeve 52 at the opposite end. The shaft 46 is maintained against axial displacement through the bearing assembly 50 the inner race of which abuts at one end against a split spring stop ring 58 received in a suitable peripheral groove in the shaft 46 and against which it is maintained by the hub of the flange member 60 of a conventional type universal joint 62 (see Fig. 1) and which flange member is splined to the shaft 46 and secured against axial displacement thereon by means of a nut 64.

In the particular illustration given, the shafts 42 and 46 are shown as being drivably connected together through the intermediary of an overrunning clutch or free wheeling unit indicated generally as at 66 and which may be of any suitable or conventional design and which may include, for instance, a shiftable clutch element 68 for locking the free wheeling unit 66 against free wheeling operation. The free wheeling unit 66 forms no part of the present invention and may be eliminated if desired, in which case the shafts 42 and 46 will be so constructed and arranged as to rotate equally with each other at all times. The gears 70 and 72 shown in Fig. 2 at the rear or right hand end of the free wheeling unit 68 are the usual speedometer drive gears provided for operating the usual speedometer and likewise form no part of the present invention.

Rotatably and axially slidably mounted upon the shaft 46 immediately to the rear of the gear 70 is a friction brake member indicated generally at 73 and including a hub portion 74 embracing the shaft 46, and an outwardly and rearwardly extending web portion 76 supporting at its periphery a frusto-conically shaped rearwardly extending portion 78. The following means are provided for causing this brake member to rotate with the shaft 46. A ring member 80 surrounding the shaft 46 rearwardly or to the right of the hub 74 is secured for equal rotation with the shaft 46 by means of a pin 82. The forward axial face of the ring member 80 is provided with a pair of diametrically opposed forwardly opening notches 84 therein. Another ring member 86 rotatably surrounds the shaft 46 forwardly or in advance of the ring 80 and is provided with a pair of rearwardly extending teeth or lugs 88 on its rear face which are axially and radially slidably received in the notches 84, the latter movement being possible to a small extent because the ring 86 has a relatively loose fit on the shaft 46. The forward axial face of the ring 86 is provided with a pair of diametrically opposed forwardly and axially tapered teeth 90, each of which is received in a correspondingly shaped rearwardly facing notch 92 formed in the rear edge of a ring member 94 secured by rivets 96 to the web 76 of the previously described brake element. The teeth 90 are disposed midway between the teeth 88 about the axis of the shaft 46, and it will be apparent that this arrangement of the teeth 88 and 90 and their engagement with the notches 84 and 92 respectively provides a connection of a type similar to that found in an Oldham coupling and, as will hereinafter be understood to be desirable, permits an equalization of the pressure between the teeth 90 and the side walls of the corresponding notches 92 so as to compensate for any manufacturing tolerances which might otherwise prevent it. For the purpose of effecting this type of drive, it will be understood that the center ring 86 surrounds the shaft 46 in a more or less loose condition in comparison to the fit of the other elements. It will also be understood, and as indicated in Fig. 2, when the servo mechanism is in inoperative position, a certain amount of axial play is provided between the rings 80, 86, and 94. It may be noted in passing, and as will hereinafter be apparent, that whether the teeth 90 and notches 92 are reversed in position on the rings 86 and 94 or not makes no difference in the functioning of the device.

A thrust bearing indicated generally at 98 is fitted about the hub 74 of the friction element 73 with its rear ring in abutting relationship to the forward face of the web 76, and the free ends of a yoke member 100 straddle the hub 74 and bear against the forward face of the forward ring of the thrust bearing 98 at diametrically opposite points thereon. The yoke member 100 is pivotally mounted within the casing 34 by means of opposite end shaft sections 102 one of which is suitably connected to a manually operable lever convenient to the operator of the vehicle in a manner which will be described in detail later. However, it may be noted at this point that rocking of the yoke 100 about the axis of the shaft 102 in a counter-clockwise direction will act to force the brake element 73 in a rearwardly direction or to the right as viewed in Fig. 2.

The sleeve 52 formed on the cover 38 projects forwardly over the ring members 80 and 86 and to a point over the ring member 94 and at its forward end is externally provided with a split spring stop ring 104 received in a suitable groove provided therefor in the sleeve 52. A thrust bearing assembly including balls 106 surrounds the sleeve 52 and its forward ring 108 abuts the stop ring 104. The rear member of this thrust bearing includes a member 110 whose forward face is of planular formation for rolling engagement with the balls 106. The member 110 is radially extended beyond the ring 108 and secured thereto as by means of rivets 112 is a second friction element, indicated generally at 113, provided for cooperation with the element 73, and which includes a cone element 114 the outer face of which is provided with a suitable friction material 116 complementary in shape and disposed within the portion 78 of the brake element 73.

As perhaps best indicated in Figs. 3 and 4, the rear axial face of the member 110 is formed to provide four axially inclined cam surfaces 120 cooperating to form two diametrically oppositely disposed rearwardly projecting cams or teeth 122. Slidably surrounding the sleeve 52 immediately rearwardly or to the right of the member 110 is an axially slidable bearing member or sleeve 124, the rear end of which is provided with a radially outwardly extending annular flange 126. Pressed upon the sleeve 124 in fixed relation therewith and in abutting relationship with respect to the flange 126 is a member 128, the forward face of which is formed to provide four axially inclined cam surfaces 130 cooperating to form a pair of forwardly extending cams or teeth 132 complementary to the cams or teeth 122 on the member 110. A pair of diametrically oppositely disposed rollers 134 are disposed between the members 110 and 128 and in contact with the respective cam surfaces thereof, the rollers 134 being maintained against relative displacement with respect to each other by being rotatably mounted upon the radially disposed pins 136 fixed to and projecting inwardly from the ring member 138 disposed about the members 110 and 128.

A horizontally disposed cross shaft 140 extending through and having suitable bearing in the cover 38 has splined thereto interiorly of the housing a yoke member 142. The free ends of the yoke member 142 bear against the stepped rear face of the member 128. Pins 143 connect the free ends of the yoke 142 with the member 128 so as to maintain the member 128 against rotation.

Figure 10:
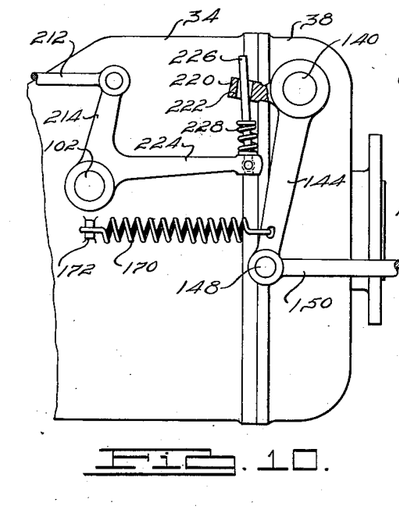
Fig. 10 is a partially broken, partially sectioned side elevational view of the servo mechanism illustrated in previous views and illustrating a construction preferably provided for limiting application of the servo mechanism when the linings of the brakes operated thereby are worn to a point where they need adjustment.

As best indicated in Fig. 10, the shaft 140 projects to the exterior of the cover 38 and there has fixed to it a depending arm 144, the lower end of which is pivotally connected by means of a pin 148 to a rod 150. Now referring to Fig. 1, it will be noted that the rear end of the rod 150 is connected by means of a pin and slot connection with the end of a lever 152 secured to a brake cross shaft 154. At each of its opposite ends the brake cross shaft 154 is provided with an upwardly extending arm or lever 156 and a downwardly extending arm or lever 158, the upwardly extending levers 156 each being connected by a rod 160 to the operating lever 26 for the corresponding brake 24 on the respective rear wheels 22, and the downwardly extending arms or levers 158 each being connected by rods 162 with the corresponding operating arm or lever 26 for the corresponding brake 24 for the front wheels 20. A rod 164 may be connected at its rear end by a suitable pin and slot connection with one of the levers 156 and at its forward end to a suitable emergency brake lever (not shown), this pin and slot connection permitting normal operation of the brakes in service without affecting the position of the emergency brake lever and the pin and slot connection between the rod 150 and the lever 152 permitting operation of the emergency brake lever without affecting the position of the elements of the servo mechanism.

As indicated in Figs. 1 and 10 and best shown in Fig. 10, a coil spring 170 is maintained under tension between the arm 144 and a lug 172 formed on the side of the housing 34, this spring constantly urging the arm 144 and shaft 140 in a clockwise direction of rotation as viewed in these figures. Referring now to Fig. 2, it will be noted that the shaft 140 in being urged toward a clockwise direction of rotation will act through the yoke 142 to urge the member 128 forwardly and this force will be transmitted through the rollers 134 to the member 110, balls 106 and member 108 and will force all of these members forwardly until the member 108 abuts the ring 104 against which it is constantly maintained. As also indicated in Fig. 2, the rollers 134 are, when the servo mechanism is in inoperative position, located at the low points of the cam surfaces 120 and 130 or, in other words, at the base of the cams 122 and 132 which thus permits the members 110 and 128 to approach each other in such a manner that their combined axial length is at a minimum value. It may also be noted that the usual spring means (not shown) found within the brakes 24 as in all conventional wheel brake mechanism and constantly tending to release the brakes, act through the various rods, arms and levers heretofore described which are interposed between them and the arm 144 to supplement the action of the spring 170. The spring 170 is provided primarily for the purpose of maintaining the various parts of the servo mechanism and particularly the members 110, 124 and rollers 134 in their normal positions during those periods that the wheel brakes are applied through the emergency brake lever.

In the operation of the device, assuming the parts to be in the positions indicated in Fig. 2, that is, in inoperative position, and the vehicle in motion, it will be understood that the shaft 46 will be rotated together with the friction element 73. The friction element 113 will be stationary, its friction facing 116 slightly spaced from the cooperating face of the friction element 73, the rollers 134 at the bottom of the respective cams 122 and 132 so that the members 110 and 128 are in a position of minimum axial displacement, and the shaft 140 and yoke 142 rotated to their extreme position of clockwise movement as viewed in Figs. 2 and 3. Under such conditions let it be assumed that the operator of the vehicle, through suitable control means which may be of any suitable type and but one of which will hereinafter be more fully described, causes the shaft sections 102 and yoke 100 to be rotated in a counter-clockwise direction as viewed in Figs. 2 and 3. When this occurs the free ends of the yoke 100 will press rearwardly against the thrust bearing 98 which, in turn, will cause the friction element 73 to be shifted axially rearwardly, it being understood that provision for such movement is provided in the connection between the members 80, 86 and 94, until the frusto-conical portion 78 of the friction element 73 engages the friction element 113. Inasmuch as only a slight amount of clearance is normally provided between the members 73 and 113, but a slight amount of bodily movement of the friction element 73 will be required to effect such engagement, and accordingly a correspondingly small amount of movement of the control element operated by the operator of the vehicle will be required.

Assuming that the vehicle is in motion and consequently that the shaft 46 is rotating when such engagement between the members 73 and 113 occurs, the member 78 in being forced to rotate with the shaft 46 will urge the member 113 toward equal rotation with it. The member 113 will, in fact, rotate a limited amount with the element 73 depending upon the force of engagement between the members 73 and 113 as will hereinafter be more apparent, and in so rotating will cause the rollers 134 to roll along its cam faces 120 and toward the point of the cam 122 and thus separate the members 110 and 128. The rollers 134, however, being frictionally engaged between the members 110 and 128 and the member 128 being maintained against rotation, the rollers 134 will roll along the cam surfaces 120 and bodily move the rollers 134 about the axis of the shaft 46 at only half of the speed and for only half of the distance that the surfaces 120 move. At the same time the rollers 134 will roll up the cam surfaces 130 of the member 128 toward the point of the cams 132 thereof, thus acting to further separate the members 110 and 128.

From the foregoing it will be observed that because of the fact the rollers 134 will move bodily in the same direction of rotation as the member 110 but at only one-half the angular speed thereof and through only one-half of the distance which any particular point on the member 110 moves during such rotation, and further that because in the particular illustrations given in Figs. 2, 3, and 4, the cam surfaces 120 each extend through an angle of 90 degrees about the axis of the shaft 46, the member 110 will be capable of rotating through a complete half revolution in moving the rollers 34 from the bottoms of the cams 122 to the tops or points thereof. Likewise, because of the fact the cam surfaces 130 and cams 132 on the member 128 are directly opposed to those on the member 110, the rollers 134 in being carried along the cams 122 will also be carried up the cams 132. From this it will be understood that in a case where the rollers 134 were permitted to move the full distance from the bottoms of the cams 122 and 132 to the tops thereof the member 110 would rotate through 180 degrees of movement and consequently will force the members 110 and 128 axially apart by a distance equal to the sum of the height of the cams 122 and 132. Thus by this construction a maximum amount of lift is obtained by cam surfaces which are so constructed and arranged as to move relative to each other a maximum distance in comparison to their individual length, resulting in a maximum amount of mechanical advantage, but on the other hand, as far as a brake servo mechanism is concerned, it is capable of being fully operated with a minimum amount of rotation of the driving shaft.

Under the conditions above explained, as the rollers 134 roll up the opposed cams 122 and 132 on the members 110 and 128 respectively, the member 110 is maintained against forward displacement through the stop ring 104 and consequently the member 128 is forced rearwardly on the sleeve 52. In moving rearwardly the member 128, because of its cooperation with the free ends of the yoke 142, will cause the yoke 142 and consequently the shaft 140 to rotate in a counter-clockwise direction of movement and through a distance depending upon the amount of rearward movement of the member 128. The shaft 140 in rotating in a counter-clockwise direction will cause a similar movement of the arm 144 which, acting through the rod 150 and lever 152, will cause the brake cross shaft 154 previously described to rotate in a counter-clockwise direction as viewed in Fig. 1 and cause application of all of the brakes 24.

As the brakes 24 are applied as above described it will be apparent that resistance to rotation of the arm 144 and consequently rearward movement of the member 128 will increase. When the amount of resistance to rearward movement of the member 128 divided by the mechanical advantage obtained through the cams 122 and 132 and rollers 134 equals the friction exerted between the friction elements 73 and 113, slippage will occur between these last two members and rotation of the friction element 113 and further application of the brakes will be stopped. If at this point a greater braking effort is desired, greater pressure is applied by the operator tending to rotate the yoke 100, thus increasing the friction between the elements 73 and 114, and further rotation of the element 113 and corresponding rearward movement of the member 128 with its corresponding further application of the brakes 24 will occur until the added resistance to application of the brakes again overcomes the friction set up between the elements 73 and 113 at which time these elements will again slip relative to one another and rotation of the element 113 and further application of the brakes cease.

The above described slippage between the friction elements 73 and 113 during application of the brakes will, of course, generate a certain amount of heat, and for the purpose of preventing overheating of the parts of the mechanism and to foster the rapid transfer of heat to the casing 34 where it may be readily dissipated, as well as to provide ample lubrication for the mechanism, the casing 34 is preferably partially filled with a relatively light lubricant which will be thrown about by the rotating parts and constantly bathe all of the mechanism.

It will be apparent that inasmuch as the degree of compression of the friction facing 116 will ordinarily be relatively slight, once the yoke is moved to bring the elements 73 and 113 into engagement with each other only a relatively slight additional movement of the control element under the control of the vehicle operator will be required to effect a higher degree of braking action and, accordingly, a very slight amount of movement of the elements under the control of the vehicle operator to effect actuation of the brakes will be required.

It will also be noted that the power actually provided for operating the brakes is derived from the shaft 46 which is drivingly connected to the road wheels of the vehicle at all times and consequently, assuming that the brakes are only applied when the vehicle is moving under its own momentum, the amount of power available for the actuation of the brakes is directly proportional to the speed of the vehicle and consequently the braking requirements of the vehicle. In this connection it may be noted that the amount of effort required to be exerted by the vehicle operator in effecting a high degree of power transmission between the shaft 46 and the brakes is enhanced in the construction shown by the use of the conical friction elements 73 and 113 which have a relatively steep angle of engagement. While this angle is not sufficiently steep to cause these elements to be frictionally locked together, nevertheless in the construction shown it is such as to materially enhance the frictional engagement of the same.

It may also be observed that when the brakes are applied as heretofore described there are no anti-friction elements rotating at propeller shaft speed which must carry the braking force exerted by the servo mechanism and that for this reason not only may the various parts be made of relatively light construction but it also enhances the long life of the construction in general. While the thrust bearing including the balls 106 is subjected to the force output of the servo mechanism, nevertheless it will be recognized that upon each application of the vehicle brakes these balls merely operate at a maximum of 180 degrees of rotation of the member 113 under conditions of maximum movement which seldom, if ever, will occur in the construction. It might also be noted that as a precaution to prevent possibility of the rollers 134 from rolling over the points of the cams 122 and 132 under unusual conditions of wear or operation, the width of the member 128 is preferably so regulated that the flange 126 of the bearing sleeve 124 will contact with the rear wall of the cover 38 before the rollers 134 reach the tips of their cooperating cams 122 and 132, and consequently it is impossible for the rollers 134 to roll over the points of their cooperating cams.

It may also be noted that as soon as the vehicle operator releases the pressure applied to the yoke 100 tending to set the brake, the frictional engagement between the members 73 and 113 will be relieved, at which time the force of the spring 170 and the usual springs contained within the brakes 24 and previously referred to will tend to move the shaft 140 and yoke 142 toward their normal position indicated in Fig. 2. The pressure thus exerted by the yoke against the member 128 tending to force it forwardly, because of the rolling engagement between the rollers 134 and the members 110 and 128 and the angularity of the cam surfaces 120 and 130, will be sufficient to cause the member 110 and the element 113 carried thereby to rotate back to their normal positions in which the rollers 134 are located at the low point of the cam members. Because of the fact that the member 110 is backed up by a thrust bearing including the balls 106, and because of the rolling engagement provided by the rollers between the members 110 and 128, only a small amount of pressure need be exerted by the yoke 142 against the member 128 to thus return the parts to their normal inoperative positions. As a matter of fact it has been found that perhaps not more than five per cent of the total force exerted by the spring 170 and the spring means within the wheel brakes 24 constantly urging the wheel brakes toward inoperative position is required to return the parts of the servo mechanism to their normal inoperative positions upon the release of the control member by the vehicle operator. The construction has been particularly designed to obtain such a condition for the reason that the smaller the amount of power required to return the mechanism to its inoperative position the more sensitive is the control of the servo mechanism by the vehicle operator. To illustrate this point let it be assumed that instead of five per cent of the force of the springs 170 and the springs within the wheel brakes 24, ninety-five per cent of the force of such springs was required to move the mechanism to inoperative position, it will be apparent that the vehicle operator, in order to release the brakes to any extent whatever, would necessarily have to release substantially all of the pressure which he exerted on the brake control element required to set the brakes and, accordingly, while he might be able to modulate the braking effect on the vehicle while applying a continually greater braking effect thereto, it would be substantially impossible for him to modulate such braking effect during a partial release of the brakes. Accordingly, it will be understood that due to the small amount of pressure required to move the present mechanism toward released position, full and complete modulation of the braking effect on the vehicle by the servo mechanism may be obtained either while the brakes are being moved toward applied position or from applied position. This capability of complete two way modulation is an important advantage of the present invention over structures heretofore suggested.

An important feature of the present invention is the reactive feel provided by the mechanism described, in the operator so as to enable him to be conscious of and determine the amount of braking force exerted by the servo mechanism at any time during the operation of the brakes. This feel is obtained for the following reason. As previously described, the friction element 73 is constrained for equal rotation with the shaft 46 through the ring member 94, teeth 90, ring member 86, teeth 88 and ring member 80. However, when the members 73 and 113 are brought into engagement to effect operation of the brakes and the member 113 has rotated to a position of balance between the amount of friction exerted between itself and the member 73 and the resistance offered by the application of the brakes to further rearward movement of the member 128, the friction exerted between the members 73 and 113 will tend to prevent the member 73 from rotating with the shaft 46 and this tendency toward retardation of rotation of the member 73 is overcome by engagement of the teeth 90 in the notches 92 of the member 94. Because the cooperating faces of the teeth 90 and notches 92 are inclined axially, the pressure exerted therebetween in compelling the member 73 to rotate with the shaft 46 under such conditions has an axial component tending to separate the members 86 and 94 and consequently to separate the friction elements 113 and 73. The force thus exerted tending to move the friction element 73 forwardly reacts against the yoke 100, tending to turn it toward brake released position, and this tendency is made apparent to the operator of the vehicle by the reactive pressure in the control pedal or element actuated by the operator to apply the brakes. The amount of reactive force thus made apparent to the vehicle operator and which is the axial component of the force tending to rotate the friction element 73 with the friction element 113 is of course, directly proportional to the amount of friction set up between the elements 73 and 113 and consequently directly proportional to the force output of the servo mechanism. Consequently, the vehicle operator is aware at all times of the relative amount of force being exerted by the servo mechanism and this regardless of any variation in the coefficient of friction between the members 73 and 113 and regardless of any particular degree of movement of the control elements operated by the vehicle operator. The amount of such reactive force made apparent to the vehicle operator may, of course, be varied by varying the angularity of the sides of the teeth 90 and notches 92, the greater the angle between the sides of the teeth 90 the greater the reactionary force apparent to the vehicle operator, and the smaller the angle between the sides of the teeth 90 the smaller the reactionary force apparent to the vehicle operator.

As has been previously described, the driving engagement between the rings 80, 86, and 94 including the teeth 88 and 90 form in effect an Oldham coupling because of which the force exerted between the two teeth 90 and the side faces of their cooperating notches 92 will be equalized at all times, thus insuring freedom from friction or sticking tendencies, and uniform operation and wear of the parts.

In the foregoing description of the operation of the mechanism no mention has been made of the direction of rotation of the shaft 46. This has been for the obvious reason that it makes no difference in the construction illustrated in Figs. 2 to 4, inclusive, whether the shaft 46 is rotated in one direction or another as the operation will be identical in both cases and, accordingly, the mechanism herein provided and heretofore described permits equally efficient operation of the brakes by the servo mechanism regardless of the direction of rotation of the shaft 46 and consequently direction of travel of the motor vehicle of which it forms a part.

Figure 5:
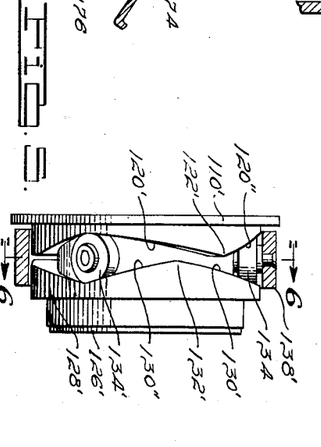
Fig. 5 is a side elevational view, partially in section, illustrating a modified form of cam means for the servo mechanism illustrated in the preceding views.
Figures 6, 8:
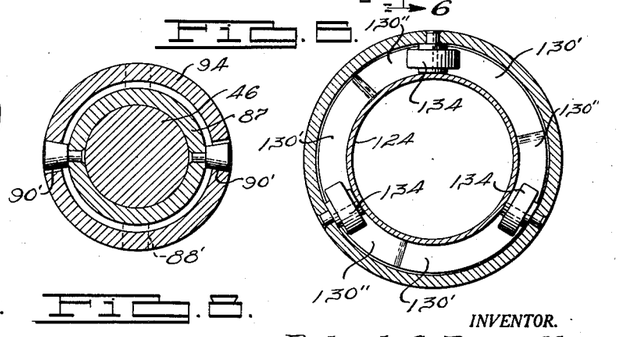
Fig. 6 is a vertical sectional view taken transversely of the mechanism illustrated in Fig. 5 as on the line 6—6 of that figure.
Fig. 8 is a transverse vertical sectional view taken on the line 8—8 of Fig. 7.

It may occur desirable in some cases, however, that the brakes be capable of being applied more forcefully when the vehicle is traveling in a forward direction than when traveling in a rearward direction and in such cases the expedient disclosed in Figs. 5 and 6 may be resorted to. In Figs. 5 and 6 the parts shown bear the same numerals as equivalent parts previously described with the exception that they carry either a prime or a double prime mark. It will also be noted that the construction shown in Figs. 5 and 6 is modified over that previously described in that the members 110' and 128' are each provided with three cams 122' and 132' respectively instead of two cams as in the previously described construction. This may be preferable under certain circumstances to better balance the transmission of forces between the members 110' and 128'. A more important feature of interest, however, is that while in the previously described construction the cam surfaces 120 on the member 110 and the cam surfaces 130 on the member 128 are all of the same length and extend to the same angular extent about the axis of the shaft 46, in Figs. 5 and 6 the cam surface 120' on one side of each of the cams 122' is longer or extends through a greater angular extent about the axis of the member 110' than the opposite surface 120'' of the cam, the longer surface 120' being so located that the rollers 134' will roll up such surfaces when the brakes are applied while the vehicle is in forward motion and will ride up the shorter surfaces 120'' when the brakes are applied while the vehicle is in rearward motion. Likewise, the cam surface 130' of each cam 132' on the member 128' is made of the same length or angular extent as the surfaces 120' on the member 110' and the surface 130'' the same length or angular extent as the surfaces 120'' on the member 110' and so arranged that the rollers 134' will roll up the longer surfaces 120' and 130' on both members 110' and 128' during application of the brakes when the vehicle is in forward motion, and up the shorter surfaces 120'' and 130'' when the brakes are applied while the vehicle is in rearward motion.

Figure 7:
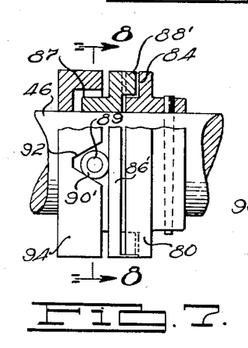
Fig. 7 is a partially broken, partially sectioned side elevational view of a modified form of driving connection between the manually operable friction element and the power shaft.

Should it be found either desirable or necessary to further increase the sensitivity of the connection between the elements manually controlled by the vehicle operator and the servo mechanism, this may be accomplished in the manner suggested in Figs. 7 and 8. In these figures parts identical to those previously described are indicated by the same numerals and it will be noted that in this case the sole difference is in connection with the construction of the ring 86 previously described. In this modification the construction of the ring 86' is identical to the construction of the ring 86 previously described as far as the rear, or right hand portion thereof as viewed in Fig. 7, is concerned but in this case the forward portion of the member 86' is provided with a forward extension 87 projecting within the rear end of the ring 94 and which extension 87 carries a pair of diametrically opposed radially outwardly extending pins 89 upon each of which is rotatably mounted a roller 90' received within the corresponding notch 92 of the ring member 94 and serving the same purpose as the teeth 90 previously described. The rollers 90' may be either straight, tapered as shown, or of any other desired conformation so long as they provide the proper rolling contact with the sides of the notches 92.

In the construction above described it will be apparent that the servo mechanism is operative to apply the vehicle brakes at any time during movement of the vehicle either in a forwardly or rearwardly direction. Even though the vehicle is not moving, the brakes may still be applied by the vehicle operator through the servo mechanism upon operation of the brake control element by the vehicle operator, for upon such operation the yoke 100 will be rotated to force the friction element 73 rearwardly into engagement with the friction element 113 and further movement of the yoke 100 will cause both of these friction elements to move bodily rearwardly, carrying with them the members 110 and 128 and thus act to rotate the yoke 142 and apply the brakes. While it would not be possible in this way to apply nearly as great a braking force as would be possible through operation of the servo mechanism, nevertheless under such conditions should actual movement of the vehicle occur the servo mechanism will immediately respond to exert its added effort. That this would occur upon a relatively slight movement of the vehicle will be evident when it is understood that the servo mechanism may be fully operated upon less than half of the revolution of the shaft 46 which rotates directly with the propeller shaft 36 and which propeller shaft is driven under normal conditions at from four to five times the speed of the rear wheels.

Figure 9:
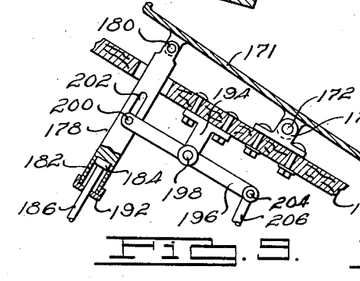
Fig. 9 is an enlarged, fragmentary, vertical sectional view taken through the toe board of the motor vehicle illustrated in Fig. 1 and illustrating one form of control mechanism for the servo mechanism which is combined for control of the engine throttle.

As previously mentioned, although any suitable or desirable form of means controlled by the operator of the vehicle may be provided for operating the above described servo mechanism through rotation of the yoke 100, it is preferable, in order to realize all of the advantages of the construction and relieve the vehicle operator of exertion in the application of the brakes to the fullest extent, that some means necessitating as little movement as possible of the vehicle operator's foot be provided for controlling the brakes. One such construction is illustrated in Figs. 1 and 9 and which is so constructed and arranged as to provide a common control means for both the brakes and the engine throttle. As best shown in Fig. 9, this control means includes a pedal member 171 pivotally supported at 172 on a bracket 174 which, in the particular illustration, is shown as being suitably secured to the toe board 176 of the vehicle. To the forward or upper end of the pedal 171 a plunger 178 is pivotally connected by means of a pin 180. The plunger 178 projects downwardly through the toe board 176 and its lower end is recessed as at 182 and slidably receives therein the enlarged head 184 of a control rod 186 operatively connected, as illustrated in Fig. 1, to the throttle control lever 188 of the engine carburetor 190. A cap 192 threaded on the lower end of the plunger 178 prevents disengagement of the head 184 from the plunger 178 in a downward direction, while contact of the head 184 against the blind end of the recess 182 limits movement of the head 184 in the opposite direction.

In the position of the parts illustrated in Fig. 9 it will be obvious that downward pressure on the forward or upper end of the pedal 171 will depress the plunger 178 which, acting against the head 184 of the rod 186, will cause the carburetor throttle valve to be opened so as to increase the speed of the engine 28. If the pedal 171 is operated in the opposite or clockwise direction of rotation from the position indicated in Fig. 9, as by pressure from the heel of the vehicle operator, the plunger 178 will move upwardly and the head 184 of the rod 186 will move downwardly in the recess 182 without causing any movement of the rod 186 and consequently the engine throttle.

A bracket member 194 is suitably secured to the under surface of the toe board 176 between the bracket 174 and the plunger 178. An arm 196 is pivotally connected between its ends by means of pin 198 to the bracket 194. The forward end of the arm 196 is provided with a pin 200 slidably received in a slot 202 extending axially of and diametrically through the plunger 178 so as to permit a lost motion connection between the arm 196 and the plunger 178. The opposite end of the arm 196 is connected by a pin 204 with one end of a link 206. As illustrated in Fig. 1, the opposite end of the link 206 is pivotally connected to one arm of a bell crank 208 pivotally mounted at 210 on the clutch housing 30. The opposite arm of the bell crank 208 is pivotally connected by means of a rod 212 with an arm 214 secured to one of the shaft sections 102 for the yoke 100 and which shaft section projects to the exterior of the casing 34.

Referring now to Fig. 9 in which the various parts are illustrated in their normal inoperative positions, that is, with the brakes released and with the engine throttle closed, it will be noted that the pin 200 is located at the bottom of the slot 202. Accordingly, when the pedal 171 is operated to open the engine throttle the pin 200 will slide up into the slot 202 without causing any operation of the arm 196. However, if the pedal 171 is rotated from inoperative position in the opposite or clockwise direction of rotation about the pin 172 and during which movement no operation of the engine throttle valve occurs, the forward end of the arm 196 will be lifted and the arm 196 will be caused to pivot in a clockwise direction of rotation as viewed in Figs. 1 and 9 about the pin 198. When thus moved the arm 196 acting through the link 206 will cause the bell crank 208 to be rotated in a counter-clockwise direction of movement and will cause the rod 212 to move forwardly and rotate the arm 214 and shaft section 102 in a counter-clockwise direction of rotation which will thus move the yoke 100 to place the servo mechanism in brake applying position. Accordingly, with the structure provided in Fig. 9 a common means is provided for operating both the engine throttle and the servo brake mechanism and with such construction it is unnecessary for the vehicle operator to remove his foot from the pedal 171 in order to control both the engine and the brakes of the vehicle.

It will be obvious to those skilled in the art that to obtain the maximum mechanical advantage of the servo mechanism it would be necessary upon each application of the brakes that the rollers 134 move from a position adjacent the bottom of the cams 122 and 132 to a position adjacent the tops or points thereof and that effective operation of the brakes begin immediately upon movement of the rollers 134 from their inoperative positions. However, due to the fact that as the linings for the brakes 24 wear it will be necessary for the rollers 134 to travel further up the cams 122 and 132 to effect full application of the brakes, such condition is not commercially practical as it would necessitate constant re-adjustment of the brakes to take up the wear of their linings. Accordingly, it is necessary to so proportion the various elements of the structure that the rollers 134 will move only a portion of their total possible travel in moving the brakes from their points of initial engagement to fully applied position during a single application of the brakes. At the same time, however, this movement should be as much as possible without requiring too frequent adjustment of the brakes 24 to take up the wear of their linings, and it will be assumed that the structure shown is so constructed and arranged. Under such conditions it is desirable to provide some means of informing the operator of the vehicle when the brakes have reached a condition of wear which makes it advisable to adjust them to compensate for such wear. Furthermore, such means is so constructed and arranged that this condition will be made known to the driver through his application of the brakes. It is also desirable to provide means for preventing excessive application of the servo mechanism when the brakes have worn to such an extent that added application of power by the servo mechanism is of no avail in increasing the braking effect. Such constructions are illustrated in Figs. 10 to 13, inclusive. Referring now to Fig. 10, it will be noted that the arm 144 is provided adjacent its hub with a forwardly extending boss-like arm 220 having an aperture 222 therein. The arm 214 on the shaft 102 which controls the yoke 100 is provided with a rearwardly extending arm 224 which terminates just short of the arm 144. An upwardly extending pin 226 is loosely connected at its lower end with the free end of the arm 224 and loosely projects through the opening 222 in the arm-like boss 220. A coil spring 228 loosely surrounds the pin 226 between the arm 224 and the arm-like boss 220. With this construction it will be apparent that when the pedal 171 is moved to operate the brake through the servo mechanism the arm 224 will be rotated in a counter-clockwise direction of rotation and that upon application of the servo mechanism the arm 144 will also be rotated in a counter-clockwise direction of rotation. Thus upon application of the brakes the free ends of the arms 220 and 224 approach each other. These arms and the length of the spring 228 are so proportioned and arranged that when the wheel brakes 24 are fully taken up for wear and the brakes are fully applied by the servo mechanism the upper end of the spring 228 will approach but will preferably be in slightly spaced relation with respect to the under face of the arm 220. As the brakes 24 wear it will obviously require a greater movement of the arm 144 to fully apply them and, as the movement of the arm 144 to fully apply the brakes increases during wear of the brakes, a condition will be reached in which the lower face of the arm 220 will contact the upper end of the spring 228 during application of the brakes and consequently compression of the spring 228 during such application will occur. The operator of the vehicle in sensing the greater pressure required to apply the brakes, because of the necessity of compressing the spring 228, will thus be acquainted with the fact that the brakes require adjustment for wear. Should this condition be allowed to continue, a condition might eventually occur in which the spring 228 will be completely compressed and thus provide a positive stop between the arms 220 and 224 preventing the vehicle operator from applying additional braking force to the yoke 100 and consequently the friction element 73. Thus with this construction means are provided whereby a condition of excessive wear of the wheel brakes will prevent an over application of pressure to the servo mechanism which would tend to foster its rapid or early destruction through wear of the friction lining 116, for instance, and at the same time provides a sensible means by which the operator of the vehicle may be acquainted with the fact that re-adjustment of the brakes is necessary in order to continue the proper functioning of the vehicle braking system.

Figure 11:
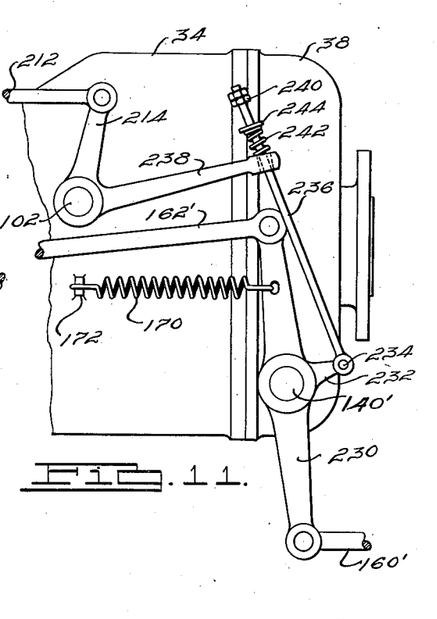
Fig. 11 is a view similar to Fig. 10 but illustrating a modification of the construction shown in Fig. 10 when the operated shaft of the servo mechanism is placed below center instead of above center as illustrated in the previous views.

In the construction of the servo mechanism described up to this point it has been assumed in all cases that the shaft 140 is positioned above the drive shaft 46 and this construction will be desirable where the clearance between the lower face of the casing 34 and the ground is an important factor and must be maintained at a minimum value. However, such construction necessitates the rod 150 being placed under compression during operation of the brakes and this is not always desirable. Accordingly, where the clearance between the casing 34 and the ground is of minor importance, the shaft 140 may be positioned below the shaft 46 as illustrated in Fig. 11, in which case the shaft 140 is indicated by an equivalent shaft 140'. In such case the yoke 142 is simply reversed in position, that is, its free ends project upwardly from the shaft 140' instead of downwardly as in the previous figures. In such case the arm 144 is replaced by a double arm 230 fixed adjacent its center to the shaft 140' exteriorly of the casing 34. This permits arms 230 to be provided on either side of the casing 34 and thus permits the rods running to the rear wheel brakes, and which rods are here illustrated at 160', to be directly connected to the lower ends of the arms 230, and permits the rods extending to the front wheel brakes, and which rods are here illustrated as at 162', to be directly connected to the respective upper ends of the arms 230. Consequently, in this construction all of the brake rods are in tension during operation of the brakes.

This last modification of the construction necessitates the modification of the construction illustrated in Fig. 10 to effect the same result. Accordingly, a short arm 232 is extended rearwardly from the hub of the arm 230 and is pivotally connected by means of a pin 234 with an upwardly extending pin or rod 236 which extends loosely through an aperture in the free end of an arm 238 fixed to and extending rearwardly from the arm 214 in the same general manner as the arm 224 previously described. In this case, however, the upper end of the rod 236 is provided with a stop member in the form of a nut 240 and between the nut 240 and the free end of the arm 238 a coil spring 242, corresponding to the spring 228 previously described, surrounds the rod 236. Preferably, a washer 244 rests against the upper end of the spring 242 for contact with the nut 240. This construction will operate in a manner similar to that described in connection with Fig. 10, namely, upon application of the brakes the nut 240 and the free end of the arm 238 will approach each other and as the wheel brakes wear the washer 244 will eventually contact with the nut 240 and compression of the spring 242 will occur.

Figure 12:
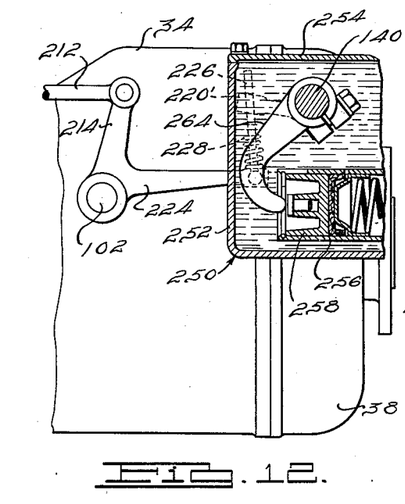
Fig. 12 is a view similar to Fig. 10 but illustrating the application of the servo mechanism to brake mechanisms of the hydraulic type.
Figure 13:
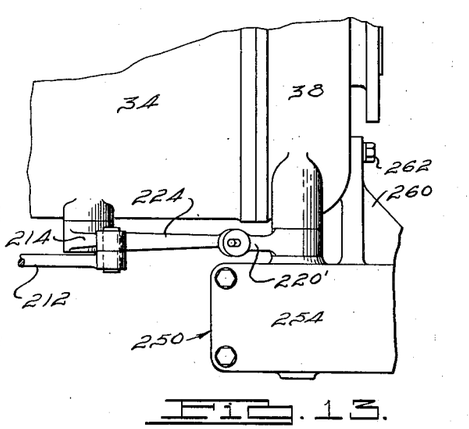
Fig. 13 is a fragmentary plan view of the mechanism shown in Fig. 12.

The constructions heretofore described are also applicable for use in connection with conventional types of hydraulic brakes and an application of the same is illustrated in Figs. 12 and 13. In these figures a conventional master cylinder is indicated generally as at 250 and includes a casing 252 forming a liquid reservoir and provided with a cover 254. Within the lower part of the casing 252 is located the usual main cylinder 256 in which the usual piston 258 is adapted to reciprocate. It is to be understood, of course, that the liquid discharged from the cylinder 256 by the piston 258 is conducted in a conventional manner to wheel brakes of the conventional hydraulic type. The casing 252 is secured to the cover 38 of the housing 34 by means of a suitable bracket 260 and screws 262. The shaft 140 is extended to within the casing 252 where an operating arm 264 for the piston 258 is secured thereto. With this construction it will be obvious that when the pedal 170 is depressed the servo mechanism will be operated to rotate the shaft 140 which, in moving the arm 264 in a counterclockwise direction of rotation, will actuate the piston 258 to force liquid from the cylinder 256 to the wheel brakes and cause actuation of the latter. With this construction in order to provide the same effect for preventing excessive application of the servo mechanism and to warn the operator of the necessity of adjusting the brakes for wear, an arm 220', corresponding to the arm 220 in Fig. 10, is secured to the shaft 140 between the casing 252 and the cover 38, and the arm 214 is provided with a second arm 224 as in Fig. 10 together with the rest of the parts described in connection with Fig. 10 for cooperation with the arm 220'. By this mechanism the same result is effected as in the construction described in connection with Fig. 10.

The illustrations herein given are intended primarily as a matter of illustration only of the broader principles of the present invention and once the teachings of the present invention are made known to those skilled in the art various modifications and changes in the specific illustrations given will be apparent to them and, accordingly, it will be understood that formal changes may be made in the specific embodiment of the invention described without departing from the spirit and substance of the broad invention, the scope of which is commensurate with the appended claims.

I claim:

1. In a servo mechanism, in combination, a driving shaft, a driving and a driven friction element, means moved by said driven friction element for applying an actuating force, means for effecting engagement of said friction elements, and means connecting said driving friction element to said driving shaft so constructed and arranged as to exert a counter force in said second mentioned means proportional to the simultaneous value of said actuating force.

2. In a servo mechanism, in combination, a driving member, a driving friction element driven by said driving member, a driven friction element movably associated therewith, means moved by said driven friction element upon movement thereof by said driving friction element for effecting an actuating force, means for controlling engagement between said friction elements, and means associated with one of said friction elements so constructed and arranged as to tend to separate said friction elements by a force proportional to the torque being transmitted through them.

3. In a servo mechanism, in combination, a driving member, a driving friction element driven by said driving member, a driven friction element movably associated therewith, means moved by said driven friction element upon movement thereof by said driving friction element for effecting an actuating force, means for forcing one of said friction elements into engagement with the other thereof, and means associated with one of said friction elements so constructed and arranged as to oppose the force of said forcing means by a force proportional to the torque being transmitted through said friction elements.

4. In a servo mechanism, in combination, a driving member, a driving friction element driven by said driving member, a driven friction element movably associated therewith, means moved by said driven friction element upon movement thereof by said driving friction element for effecting an actuating force, means for forcing one of said friction elements into engagement with the other thereof, and means associated with said one of said friction elements so constructed and arranged as to tend to separate said friction elements against the force of said forcing means by a force proportional to the torque being transmitted through said friction elements.

5. In a servo mechanism, in combination, a driving member, a driving friction element driven by said driving member, a driven friction element movably associated therewith, means moved by said driven friction element upon movement thereof by said driving friction element for effecting an actuating force, means for forcing one of said friction elements into engagement with the other thereof, and means connecting said driving friction element with said driving member so constructed and arranged as to oppose the force of said forcing means by a force proportional to the torque being transmitted through said friction elements.

6. In a servo mechanism, in combination, a driving member, a driving friction element driven by said driving member, a driven friction element movably associated therewith, means moved by said driven friction element upon movement thereof by said driving friction element for effecting an actuating force, means for forcing one of said friction elements into engagement with the other thereof, and cam means connecting said driving friction element with said driving member so constructed and arranged as to oppose the force of said forcing means by a force proportional to the torque being transmitted through said friction elements.

7. In a servo mechanism, in combination, a driving shaft, a friction element, means for shifting said friction element axially in one direction, a driving connection between said shaft and friction element so constructed and arranged as to tend to force said friction element in a direction opposite to the first mentioned direction upon the application of a force to said friction element tending to retard its rotation relative to said shaft, a second friction element rotatable relative to said shaft and engageable with the first mentioned friction element, actuating means movable by said second friction element upon rotational movement thereof.

8. In a servo mechanism, in combination, a driving shaft, a friction element, means for shifting said friction element axially in one direction, a driving connection between said shaft and friction element including cam means associated between said shaft and friction element so constructed and arranged as to exert an axial force in opposition to a force exerted by said shifting means proportional to a force resisting rotation of said friction element with said shaft, a second friction element rotatable relative to said shaft and engageable with the first mentioned friction element, and actuating means movable by said second friction element upon rotational movement thereof.

9. In a servo mechanism, in combination, a driving shaft, a friction element, cooperating cam elements on said shaft and said friction element tending to rotate one with the other and so constructed and arranged as to tend to move said friction element axially of said shaft by a force proportional to the torque being transmitted between it and said shaft, means for manually shifting said friction element in a direction opposite to that in which said cam elements tend to shift it, a second friction element engageable by the first mentioned friction element upon movement of the latter by said means, and an actuating member movable by movement of said second friction element under the influence of said first mentioned friction element.

10. In a servo mechanism, in combination, a driving shaft, a friction element, a member fixed to said shaft for equal rotation therewith, a second member drivingly connected with the first mentioned member and bodily shiftable relative thereto diametrically of said shaft, diametrically opposite cam means on said second member and said friction element arranged in perpendicular relationship to the plane of movement of said second member relative to said first mentioned member and adapted to drivingly connect said friction element to said second member, a second friction element, means for moving the first mentioned friction element into driving engagement with said second friction element, and an actuating member moved by movement of said second friction element under the influence of said first mentioned friction element.

11. In a servo mechanism, in combination, a driving member, a driven member, a driving and a driven friction element, means interconnecting said driven friction element with said driven member for interrelated movements, means for applying pressure to said driving friction element tending to urge it into engagement with said driven friction element, and means drivingly connecting said driving member and said driving friction element so constructed and arranged as to exert a force in the first mentioned means in opposition to said pressure and proportional in extent to the force simultaneously exerted by said driven member.

12. In a servo brake mechanism for wheeled vehicles, in combination, a driving element, a friction element rotatable therewith, a second rotatable friction element adapted for engagement with the first mentioned friction element, cam means positioned on that side of said second friction element opposite to said first mentioned friction element and rotatable with said second friction element, a second cam means slidably but non-rotatably mounted in cooperative relationship with respect to the first mentioned cam means so as to be moved axially thereby upon rotational movement thereof, wheel brakes actuated by axial movement of said second cam means, and means for moving said first mentioned friction element into engagement with said second friction element.

13. In a servo brake mechanism for vehicles having wheel brakes, in combination, a driving element, a friction element rotatable therewith, a second rotatable friction element adapted for engagement with the first mentioned friction element, cam means positioned on that side of said second friction element opposite to said first mentioned friction element and rotatable with said second friction element, means limiting movement of said second friction element toward said first mentioned friction element, a second cam means slidably but non-rotatably mounted in cooperative relationship with respect to the first mentioned cam means so as to be moved axially thereby upon rotational movement thereof, a rock shaft actuated by axial movement of said second cam means, a connection beween said rock shaft and the wheel brakes for actuating the latter upon actuation of said rock shaft, and means for moving said first mentioned friction element into engagement with said second friction element.

14. In a servo mechanism, in combination, a driving element, a friction element rotatable therewith, a second rotatable friction element adapted for engagement with the first mentioned friction element and supported independently of said shaft, cam means positioned on that side of said second friction element opposite to said first mentioned friction element and rotatable with said second friction element, means including an anti-friction bearing limiting movement of said second friction element toward said first mentioned friction element, a second cam means slidably but non-rotatably mounted in cooperative relationship with respect to the first mentioned cam means so as to be moved axially thereby upon rotational movement thereof, means actuated by axial movement of said second cam means, and means for moving said first mentioned friction element into engagement with said second friction element including a pedal and a connection between said pedal and said first mentioned friction element setting up a reaction in opposition to the force applied to said pedal proportional to the torque transmitted through said friction elements.

15. In a servo brake mechanism for automobiles having wheel brakes, in combination, a drive shaft, a friction element slidably mounted thereon and constantly rotatable therewith, a second friction element engageable with the first mentioned friction element, said second element being mounted for rotatable movement, a cam member rotatable with said second element and positioned on that side of said second element opposite to said first mentioned element, a second cam member held against rotation, anti-friction means between said cam members, said cam members being so constructed and arranged and so cooperating with said anti-friction means that relative rotation between them effects axial displacement of one relative to the other, abutment means limiting axial movement of the first mentioned cam member toward said first mentioned friction element, an operating member arranged for operative movement upon axial movement of said second cam member, a connection between said operating member and said brakes for effecting simultaneous movement thereof, and means for controlling the axial position of said first mentioned friction element.

16. In a servo brake mechanism for automobiles having wheel brakes, in combination, a driving element, a friction element rotatable therewith, a second rotatable friction element adapted for engagement with the first mentioned friction element, a cam member on that side of said second friction element opposite to said first mentioned friction element and rotatable with said second friction element, a second cam member slidably but non-rotatably mounted in cooperative relation with the first mentioned cam member, said cam members being provided with cooperating cams and rollers so constructed and arranged that said cam members are movable relative to one another through approximately at least 180° of rotation in effecting maximum axial displacement between them, means actuated by axial displacement between said cam members having an operative connection with said wheel brakes whereby to effect actuation of said wheel brakes upon actuation thereof, and means for moving said first mentioned friction element into engagement with said second friction element.

17. In a servo mechanism, in combination, a pair of relatively shiftable friction members, means for rotatably driving one of said friction members, a pair of cooperating cam elements so constructed and arranged as to effect axial displacement between them upon relative rotation, rolling anti-friction members positioned between the cooperating faces of said cam elements, a ring member disposed outwardly of said cam elements in concentric relation thereto, means carried solely by said ring member for guiding said anti-friction members, one of said friction members and one of said cam elements being arranged for simultaneous rotary movement, an operating member associated with and movable by the other of said cam elements, and means for controlling the engagement between said friction members.

18. In a servo mechanism, in combination, a pair of relatively shiftable friction members, means for rotatably driving one of said friction members, a pair of cooperating cam elements so constructed and arranged as to effect axial displacement between them upon relative rotation, a ring member disposed outwardly of said cam elements in concentric relation thereto, a plurality of pins projecting radially inwardly from said ring, a roller rotatably mounted on each of said pins between the cooperating faces of said cam elements, one of said friction members and one of said cam elements being arranged for simultaneous rotary movement, an operating member associated with and movable by the other of said cam elements, and means for controlling the engagement between said friction members.

19. In combination, a power shaft, a servo mechanism operable thereby, an actuating member movable by said servo mechanism, a member movable to control the operation of said servo mechanism, and means coacting between said control member and said actuating member for limiting the extent of actuation of said servo mechanism.

20. In combination, a power shaft, a servo mechanism operable thereby, an actuating member movable by said servo mechanism, a member movable to control the operation of said servo mechanism, and means movably associated with said control member and said actuating member respectively and with each other for limiting the extent of actuation of said servo mechanism.

21. In combination, a power shaft, a servo mechanism operable thereby, an actuating member movable by said servo mechanism, a member movable to control the operation of said servo mechanism, an element movable with said control member, and a second element movable with said actuating member, said elements cooperating with one another to limit actuation of said servo mechanism.

22. In combination, a power shaft, a servo mechanism operable thereby, an actuating member movable by said servo mechanism, a member movable to control the operation of said servo mechanism, an element movable with said control member, and a second element movable with said actuating member, said elements having portions movable in opposition to each other during actuation of said servo mechanism and cooperating to limit the degree of actuation of said servo mechanism.

23. In combination, a power shaft, a servo mechanism operable thereby, an actuating member movable by said servo mechanism, a member movable to control the operation of said servo mechanism, an element movable with said control member, a second element movable with said actuating member, said elements having portions movable in opposition to each other during actuation of said servo mechanism, and resilient means cooperating between said oppositely movable portions to limit the extent of movement of one of said elements with respect to the other.

24. In a servo brake mechanism, in combination, a rotatable drive shaft, a member fixed for rotation therewith, a second member frictionally engageable with the first mentioned member and adapted to be urged toward rotation therewith, cam means rotatable with said second member, braking means adapted to be actuated by said cam means, a pedal, means operable by said pedal for effecting frictional engagement of said members, and torque responsive means in the line of connection between said cam means and said pedal so constructed and arranged as to oppose the force applied to said pedal in proportion to the degree of torque simultaneously transmitted between said members.

25. In a servo brake mechanism, in combination, a rotatable drive shaft, a member fixed for rotation therewith, a second member frictionally engageable with the first mentioned member and adapted to be urged toward rotation therewith, cam means rotatable with said second member, braking means adapted to be actuated by said cam means, a pedal, means operable by said pedal for effecting frictional engagement of said members, and wedge means in the line of connection between said cam means and said pedal so constructed and arranged as to oppose the force applied to said pedal in proportion to the degree of torque simultaneously transmitted between said members.

26. In a servo brake mechanism, in combination, a rotatable drive shaft, a member fixed for rotation therewith, a second member frictionally engageable with the first mentioned member and adapted to be urged toward rotation therewith, cam means rotatable with said second member, braking means adapted to be actuated by said cam means, a pedal, means operable by said pedal for effecting frictional engagement of said members, and cam and roller means in the line of connection between said cam means and said pedal so constructed and arranged as to oppose the force applied to said pedal in proportion to the degree of torque simultaneously transmitted between said members.

27. In a servo mechanism, in combination, a rotatable driving shaft, a driving friction element rotatable therewith, a driven friction element engageable with said driving friction element and adapted for rotatable movement thereby, pedal means for effecting engagement of said friction elements, braking means actuated by movement of said driven friction element, and cam means in the connection between said pedal and said braking means acting to transmit the torque exerted between said driving shaft and driven friction element required to actuate said braking means, said cam means being so constructed and arranged as to resist actuation of said pedal means toward brake actuating position in proportion to the amount of torque transmitted through it.

ROBERT C. RUSSELL.